United States Patent
Tang et al.

(10) Patent No.: US 11,243,958 B2
(45) Date of Patent: Feb. 8, 2022

(54) IMPLEMENTING CONTRACT-BASED POLYMORPHIC AND PARALLELIZABLE SQL USER-DEFINED SCALAR AND AGGREGATE FUNCTIONS

(71) Applicant: Teradata US, Inc., San Diego, CA (US)

(72) Inventors: Xin Tang, Dayton, OH (US); James Shau, Dayton, OH (US); Robert Wehrmeister, Austin, TX (US); Daniel T. Yu, Dayton, OH (US)

(73) Assignee: Teradata US, Inc., San Diego, CA (US)

( * ) Notice: Subject to any disclaimer, the term of this patent is extended or adjusted under 35 U.S.C. 154(b) by 900 days.

(21) Appl. No.: 15/058,590

(22) Filed: Mar. 2, 2016

(65) Prior Publication Data

US 2017/0193054 A1    Jul. 6, 2017

Related U.S. Application Data

(60) Provisional application No. 62/273,984, filed on Dec. 31, 2015.

(51) Int. Cl.
  *G06F 17/00*    (2019.01)
  *G06F 16/2457*  (2019.01)
  *G06F 16/2458*  (2019.01)

(52) U.S. Cl.
  CPC .... *G06F 16/24575* (2019.01); *G06F 16/2458* (2019.01)

(58) Field of Classification Search
  None
  See application file for complete search history.

(56) References Cited

U.S. PATENT DOCUMENTS

| | | | |
|---|---|---|---|
| 4,406,605 A | 9/1983 | Hand | |
| 4,760,525 A | 7/1988 | Webb | |
| 5,432,893 A | 7/1995 | Blasubramanian et al. | |
| 5,487,112 A | 1/1996 | Zygourakis et al. | |
| 5,554,992 A | 9/1996 | Toth et al. | |
| 6,240,278 B1 | 5/2001 | Midya et al. | |
| 6,250,930 B1 | 6/2001 | Mintz | |
| 6,393,472 B1 | 5/2002 | Anerousis et al. | |

(Continued)

OTHER PUBLICATIONS

"Amazon Redshilt: API Reference", API Version Dec. 1, 2012, Amazon Web Services, [Online]. Retrieved from the Internet: <URL: http://docs.aws.amazon.com/redshift/latest/APIReference/redshift-api.pdf>, (2016), 242 pgs.

(Continued)

*Primary Examiner* — Anhtai V Tran
(74) *Attorney, Agent, or Firm* — James Stover

(57) ABSTRACT

Disclosed are systems and methods for implementing contract-based polymorphic and parallelizable user-defined scalar and aggregate functions. The systems and methods can include receiving a query including a plurality of user-defined functions, parsing the query into a plurality of nodes (e.g., basic operation unit or atomic operator), generating an execution plan that minimizes data transfer between the plurality of nodes, and executing the plan in a distributed environment. Each of the plurality of user-defined functions can correspond to one of a plurality of nodes.

12 Claims, 4 Drawing Sheets

(56) References Cited

U.S. PATENT DOCUMENTS

| | | | |
|---|---|---|---|
| 7,020,649 B2 | 3/2006 | Cochrane et al. |
| 7,111,020 B1 | 9/2006 | Gupta et al. |
| 7,181,449 B2 | 2/2007 | Ramsey et al. |
| 7,181,460 B2 | 2/2007 | Coss et al. |
| 7,542,962 B2 | 6/2009 | Finlay et al. |
| 7,565,201 B2 | 7/2009 | Blackmore et al. |
| 7,716,080 B2 | 5/2010 | Postrel |
| 7,763,207 B2 | 7/2010 | Kratzer et al. |
| 7,856,382 B2 | 12/2010 | Kim et al. |
| 7,912,834 B2 | 3/2011 | Gupta et al. |
| 7,996,250 B2 | 8/2011 | Wiener et al. |
| 8,065,249 B1 | 11/2011 | Harris et al. |
| 8,069,193 B2 | 11/2011 | Cu et al. |
| 8,103,689 B2 | 1/2012 | Gupta et al. |
| 8,108,443 B2 | 1/2012 | Thusoo |
| 8,150,793 B2 | 4/2012 | Ah-Pine |
| 8,195,507 B2 | 6/2012 | Postrel |
| 8,239,438 B2 | 8/2012 | Muff et al. |
| 8,281,282 B2 | 10/2012 | Smith |
| 8,402,028 B2 | 3/2013 | Weissman |
| 8,484,269 B2 | 7/2013 | Cormode et al. |
| 8,504,409 B2 | 8/2013 | Lawton et al. |
| 8,510,534 B2 | 8/2013 | Van Berkel et al. |
| 8,538,954 B2 | 9/2013 | George et al. |
| 8,756,096 B2 | 6/2014 | Lawton et al. |
| 8,787,875 B2 | 7/2014 | Ahmed et al. |
| 9,015,688 B2 | 4/2015 | Tian et al. |
| 9,109,155 B2 | 8/2015 | Tang et al. |
| 9,170,984 B2 | 10/2015 | Cormode et al. |
| 9,244,974 B2 | 1/2016 | Mauras et al. |
| 2001/0031454 A1 | 10/2001 | Mintz |
| 2002/0143748 A1 | 10/2002 | Cu et al. |
| 2003/0233380 A1 | 12/2003 | Coss et al. |
| 2004/0122814 A1 | 6/2004 | Zhang et al. |
| 2004/0128289 A1 | 7/2004 | Cochrane et al. |
| 2004/0220908 A1 | 11/2004 | Finlay et al. |
| 2005/0021400 A1 | 1/2005 | Postrel |
| 2005/0060322 A1 | 3/2005 | Thusoo |
| 2006/0136415 A1 | 6/2006 | Ramsey et al. |
| 2006/0161221 A1 | 7/2006 | Blackmore et al. |
| 2006/0212436 A1 | 9/2006 | Gupta et al. |
| 2006/0242132 A1 | 10/2006 | Smith |
| 2007/0243105 A1 | 10/2007 | Kratzer et al. |
| 2007/0257354 A1 | 11/2007 | Cohen et al. |
| 2008/0103866 A1 | 5/2008 | Wiener et al. |
| 2009/0049113 A1 | 2/2009 | Muff et al. |
| 2009/0077010 A1 | 3/2009 | Muras et al. |
| 2009/0077054 A1 | 3/2009 | Muras et al. |
| 2009/0172058 A1 | 7/2009 | Cormode et al. |
| 2009/0177559 A1 | 7/2009 | Kim et al. |
| 2009/0276482 A1* | 11/2009 | Rae .................. G06F 9/5027 |
| | | 709/201 |
| 2010/0005050 A1 | 1/2010 | Ah-Pine |
| 2010/0111292 A1 | 5/2010 | Betouin et al. |
| 2010/0223118 A1 | 9/2010 | Postrel |
| 2011/0078010 A1 | 3/2011 | Postrel |
| 2011/0106790 A1 | 5/2011 | Gupta et al. |
| 2011/0208739 A1 | 8/2011 | Weissman |
| 2012/0190331 A1 | 7/2012 | Ahmed et al. |
| 2012/0191642 A1* | 7/2012 | George .............. G06F 17/30448 |
| | | 707/602 |
| 2012/0191699 A1 | 7/2012 | George et al. |
| 2012/0283419 A1 | 11/2012 | Thiyagarajan et al. |
| 2013/0040518 A1 | 2/2013 | Larsen et al. |
| 2013/0132124 A1 | 5/2013 | Kusunoki |
| 2013/0212141 A1 | 8/2013 | Cormode et al. |
| 2013/0253984 A1 | 9/2013 | Lawton et al. |
| 2013/0318511 A1 | 11/2013 | Tian et al. |
| 2014/0023015 A1 | 1/2014 | Frederksen et al. |
| 2014/0095470 A1* | 4/2014 | Chen ................ G06F 17/30466 |
| | | 707/714 |
| 2014/0244967 A1 | 8/2014 | Ingle et al. |
| 2014/0317255 A1 | 10/2014 | Krishna |
| 2014/0330630 A1 | 11/2014 | Postrel |
| 2014/0348753 A1 | 11/2014 | Tang |
| 2015/0379077 A1* | 12/2015 | Grosse .............. G06F 17/30445 |
| | | 707/718 |

OTHER PUBLICATIONS

"Amazon Redshift: Database Developer Guide", API Version Dec. 1, 2012, Amazon Web Services, [Online]. Retrieved from the Internet: <URL: http://docs.aws.amazon.com/redshift/latest/dg/redshift-dg.pdf>, (2016), 844 pgs.

"Amazon Redshift: Getting Started Guide", API Version Dec. 1, 2012, Amazon web services, [Online], Retrieved from the Internet: <URL: http://docs.aws.amazon.com/redshift/latest/gsg/redshift-gsg.pdf>, (2016), 23 pgs.

"Amazon Redshilt: Management Guide", API Version Dec. 1, 2012, Amazon Web Services, [Online]. Retrieved from the Internet: <URL: http://docs.aws.amazon.com/redshift/latest/mgmt/redshift-mgmt.pdf>, (2016), 265 pgs.

"Apache Hadoop 2.7.2", With Specification Work attached: Hadoop, The Apache Software Foundation, [Online]. Retrieved from the Internet: <URL: https://hadoop.apache.org/docs/stable/>, (Last Published: Jan. 26, 2016), 56 pgs.

"Apache Hive Tm", With Getting Started Guide attached, [Online]. Retrieved from the Internet: <URL: https://hive.apache.org/>, (2014), 16 pgs.

"Aster Analytics Foundation User Guide", TeraDATA, Version 6.20, (Oct. 2015), 1193 pgs.

"Aster Database Platform/OS Support Matrix", TeraDATA, Version AD 6.20, (Nov. 17, 2015), 8 pgs.

"Aster Developer Guide", TeraDATA, Release 6.20, (Nov. 2015), 218 pgs.

"Create User-defined Functions ?Database Engine?", SQL Server 2014, (Accessed on: Mar. 1, 2016), 5 pgs.

"Developing User-defined Routines (SQL and External)", IBM DB2 10.5 for Linux, UNIX, and Windows, (Copyright: 2013), 349 pgs.

"Greenplum Database 4.3.6.1", Pivotal (Release Notes), Rev: A02, (Nov. 2015), 41 pgs.

"MySQL 5.6 Reference Manual", MySQL, [Online]. Retrieved from the Internet: <URL: http://downloads.mysql.com/docs/refman-5.6-en.pdf>, (Accessed: Mar. 1, 2016), 4136.

"Oracle® Database Concepts", 12c Release 1 (12.1), [Online]. Retrieved from the Internet: <URL: https://docs.oracle.com/database/121/CNCPT/intro.htm#CNCPT001>, (Nov. 2015), 646 pgs.

"Parallel database systems: the future of high performance database systems", Communications of the ACM, 35(6), (Jun. 2006), 85-98.

"RedShift: Description", Amazon Web Services, [Online], Retrieved from the Internet: <URL: http://docs.aws.amazon.com/cli/latest/reference/redshift/index.html>, (2016), 1 pgs.

"SAP Sybase IQ 16.0 SP03", SAP: User-Defined Functions, [Online]. Retrieved from the Internet: <URL: http://infocenter.sybase.com/help/topic/com.sybase.infocenter.dc01034.1603/doc/pdf/iqudf.pdf>, (Accessed: Mar. 1, 2016), 398 pgs.

"Teradata Aster Big Analytics Appliance: An Industry First", TeraDATA: EB 6434, [Online]. Retrieved from the Internet: <URL: http://assets.teradata.com/resourceCenter/downloads/Brochures/EB6434_rev.pdf?processed=1>, (Aug. 2014), 4 pgs.

"Transaction Processing Performance Council (TPC)", TPC Benchmark™ DS, Standard Specification Version 2,1.0, (Nov. 2015), 135 pgs.

"Vertica Documentation: HPE Vertica Analytics Platform", Hewlett Packard Enterprise, Software Version 7.1.x, (Dec. 9, 2015), 4642 pgs.

"Welcome to Apache Giraph", Apache Giraph, Version 1.2.0—Snapshot, [Online]. Retrieved from the Internet: <URL: http://giraph.apache.org/>, (Last Published: Aug. 31, 2015), 1 pgs.

"Welcome to Apache Pig!", hadoop, [Online]. Retrieved from the Internet: <URL: https://pig.apache.org/>, (Last Published: Jun. 6, 2015), 2 pgs.

(56) References Cited

OTHER PUBLICATIONS

Dean, Jeffrey, et al., "MapReduce: Simplified Data Processing on Large Clusters", Communications of the ACM, 51(1), (Jan. 2008), 107-113.

Friedman, Eric, et al., "SQL/MapReduce: A practical approach to self-describing, polymorphic, and parallelizable user-defined functions", Proceedings of the VLDB (Very Large Data Bases) Endowment. 2(2), (Aug. 2009), 1402-1413.

Jaedicke, Michael, et al., "A Framework for Parallel Processing of Aggregate and Scalar Functions in Object-Relational DBMS", Proceedings of the ACM SIGMOD international conference on Management of data, (1998), 379-389.

Laney, Doug, "3D Data Management: Controlling Data Volume, Velocity and Variety", META Group: Application Delivery Strategies, File No. 949, (Feb. 6, 2001), 4 pgs.

Malewicz, Grzegorz, et al., "Pregel: a system for large-scale graph processing", Proceedings of the 2010 ACM SIGMOD International Conference on Management of Data (SIGMOD '10), (2010), 135-146.

Olston, Christopher, et al., "Pig latin: a not-so-foreign language for data processing", SIGMOD '08 Proceedings of the 2008 ACM SIGMOD international conference on Management of data, (2008), 1099-1110.

Pandit, Aditi, et al., "Accelerating Big Data Analytics With Collaborative Planning in Teradata Aster 6", ICDE Conference 2015, (2015), 1304-1315.

Shatdal, Ambuj, et al., "Adaptive Parallel Aggregation Algorithms", Proceedings of the 1995 ACM SIGMOD international conference on Management of data, (1995), 104-114.

Simmen, David, et al., "Large-Scale Graph Analytics in Aster 6: Bringing Context to Big Data Discovery", Proceedings of the VLDB (Very Large Data Bases) Endowment, 7(13), (Aug. 2014), 1405-1416.

Stonebraker, Michael, et al., "Extending a database system with procedures", ACM Transactions on Database Systems (TODS), 12(3), (Sep. 1987), 350-376.

Stonebraker, Michael, et al., "The POSTGRES next generation database management system", Communications of the ACM, 34(10), (Oct. 1991), 78-92.

Thusoo, Ashish, et al., "Hive: A Warehousing Solution Over a Map-Reduce Framework", Proceedings of the VLDB Endowment 2(2), (Aug. 2009), 1626-1629.

Ye, Yang, et al., "Scalable Aggregation on Multicore Processors", Proceedings of the Seventh International Workshop on Data Management on New Hardware, (Jun. 2011), 1-9.

* cited by examiner

IMPLEMENTING CONTRACT-BASED POLYMORPHIC AND PARALLELIZABLE SQL USER-DEFINED SCALAR AND AGGREGATE FUNCTIONS

PRIORITY APPLICATIONS

This application claims the benefit of U.S. Provisional Application Ser. No. 62/273,984, filed Dec. 31, 2015, the content of which is incorporated herein by reference in its entirety.

BACKGROUND

A database is an organized collection of data. It is the collection of schemas, tables, queries, views and other objects. The data is typically organized to model aspects of reality in a way that supports processes requiring information, such as modelling the availability of rooms in hotels in a way that supports finding a hotel with vacancies. Databases can be accessible by one or more users or application.

SUMMARY

Disclosed are systems and methods for implementing contract-based polymorphic and parallelizable user-defined scalar and aggregate functions. The systems and methods can include receiving a query including a plurality of user-defined functions, parsing the query into a plurality of nodes (e.g., basic operation unit or atomic operator), generating an execution plan that minimizes data transfer between the plurality of nodes, and executing the plan in a distributed environment. Each of the plurality of user-defined functions can correspond to one of a plurality of nodes.

BRIEF DESCRIPTION OF THE DRAWINGS

The above-mentioned and other features and advantages of this disclosure, and the manner of attaining them, will become more apparent and the disclosure itself will be better understood by reference to the following description of embodiments taken in conjunction with the accompanying drawings, where.

Corresponding reference characters indicate corresponding parts throughout the several views. The exemplifications set out herein illustrate example embodiments, and such examples are not to be construed as limiting the scope of the claims in any manner.

DETAILED DESCRIPTION

Figure 1:
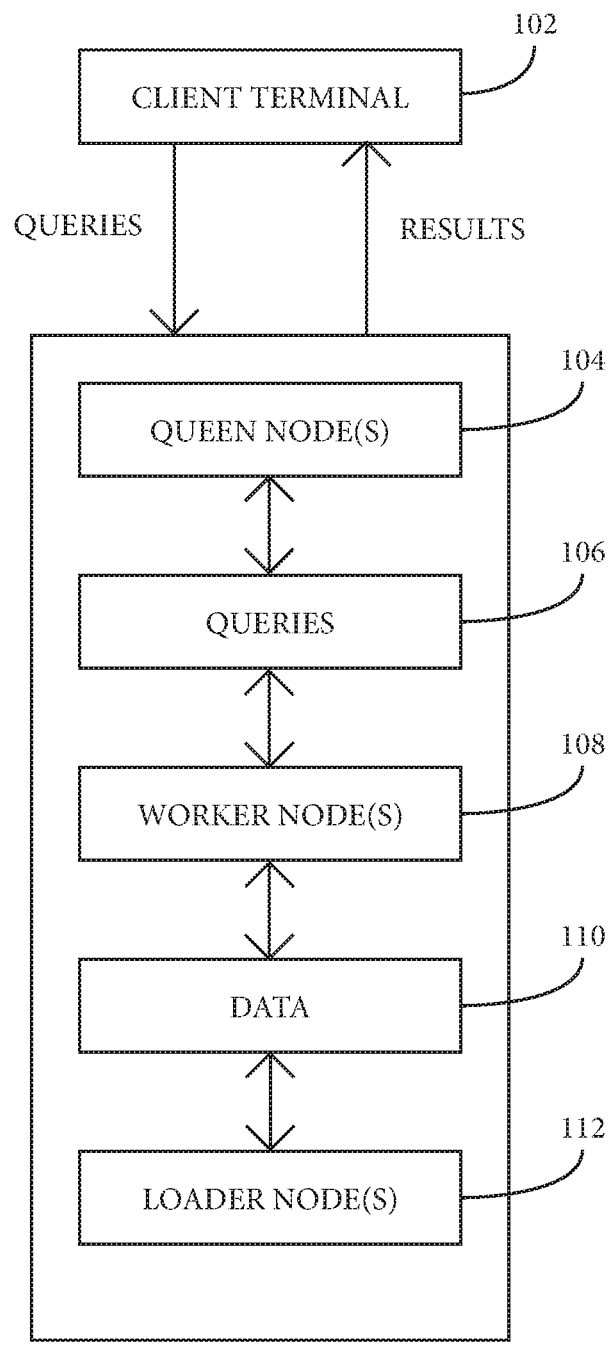
FIG. 1 illustrates an example schematic of a system for implementing user-defined scalar and aggregate functions in accordance with embodiments disclosed herein.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit the disclosure. Instead, the proper scope of any invention disclosed herein is defined by the appended claims.

Big data analytics can provide advanced methods to extract values from massive amounts of data in various formats. Big data analytics can enable discovery of correlations and patterns hidden inside large volumes of data. Exposure from big data analytics can assist in driving business more successfully by allowing accurate predictions of user loyalty, identifying manufacturing defect root causes, and recommending highly interesting products to customers.

The discovery procedure can utilize multi-genres of data processing and analytic techniques such as MapReduce, graph analysis, statistics, data mining, machine learning, etc. To unveil insight of business processes, data scientists can analyze data from various sources collectively, such as analyzing well-structured transaction data along with multi-structured data like sensor data, application logs, call center records, and social network connections. A single discovery problem may be solved by applying many different analytic techniques and data types.

Because of the unique volume, velocity, and variety of big data, data processing frameworks can include three common features: 1) extensible distributed storage that can save large volumes of data and is highly fault-tolerant; 2) a parallel architecture that can be optimized to support user-defined analytic functions; and 3) a query language that can be based on relational algebra and can offer simple abstraction to manipulate data and logical independency for applications.

Although these frameworks are adept at solving big data problems, many of them have limitations. One limitation can be the incapability to combine executions of different analytic computations. The analytic function interfaces are usually designed for one programming paradigm such as MapReduce or Graph. To accommodate the limitations data scientists can build data processing pipelines between frameworks to address problems that involve different analytic techniques. This can imply extra development costs and inflexibility. Another limitation can be no optimization for global data movement. When different frameworks are pipelined their internals remain unknown to each other and data movement is not optimal across the framework even though they share the same distributed storage. This un-optimized data movement can result in high unnecessary input/output (I/O) costs and bad overall performance, especially when the volume of data is large. The third limitation can be the restricted expression of analytic functions in the query language SQL, which can restrict connecting their capability to the rich ecosystems of business applications.

As disclosed herein, a parallel architecture can integrate traditional transaction user-defined functions with MapReduce and graph computation models. The systems and methods disclosed herein can offer flexible SQL expressions to invoke user-defined scalar functions, aggregate functions, MapReduce table functions, and graph table functions. An analytic function can be composed with another using SQL and the systems and method implement a global planner to generate execution plans and optimize overall data movements.

Disclosed herein are systems and methods that provide an analytic architecture in which user-defined scalar and aggregate functions can be composed in a SQL query with other programming paradigms. For example, a dynamic polymorphic programming interface and multi-compute execution engine can allow for user-defined scalar and aggregate functions in Java and C. In addition, a planner can be used to optimize global data movements for combined execution of user-defined scalar function, aggregate function, MapReduce function, and graph functions. User-defined scalar and aggregate functions can be enabled in different SQL syntaxes and extend SQL capability to connect with business applications. Java and C SDK's can be created for users to develop and test user-defined scalar and aggregate functions to meet different analytic needs.

As disclosed herein, the systems and methods can all for a shared nothing, massive parallel processing database that can be designed for online analytical processing (OLAP) and data warehouse tasks. The systems and methods disclosed herein can manage a cluster of commodity and appliance servers which can be scaled up to hundreds of nodes and analyze petabytes of data.

FIG. 1 illustrates various interactions between different components of a system 100 during data processing. The components of the system 100 shown in FIG. 1 can be distributed across multiple servers or nodes. The system 100 can include a client terminal 102, a queen node 104, queries 106, worker nodes 108, data 110, and loader nodes 112. The queen node 104 that can be responsible for query planning and metadata management. A loader node 112 can move data into or out of a cluster. A worker node 108 can store data and can process query execution plans.

While FIG. 1 shows a queen node 104, multiple queen nodes can be implemented. For example, a second queen node can be used as a backup queen node. In addition, the loader node 112 can consist of multiple loader nodes and the work node 108 can include multiple worker nodes. For instance, the system may include two queen nodes, to loader nodes, and 4 to 16, or more worker nodes. The various nodes can be connected with interconnect InfiniBand such as for example 40 Gb/s interconnects. Depending on the amount of data to be processed, the system 100 can be scaled using additional nodes, expansion cabinets, and network switches.

Figure 2:
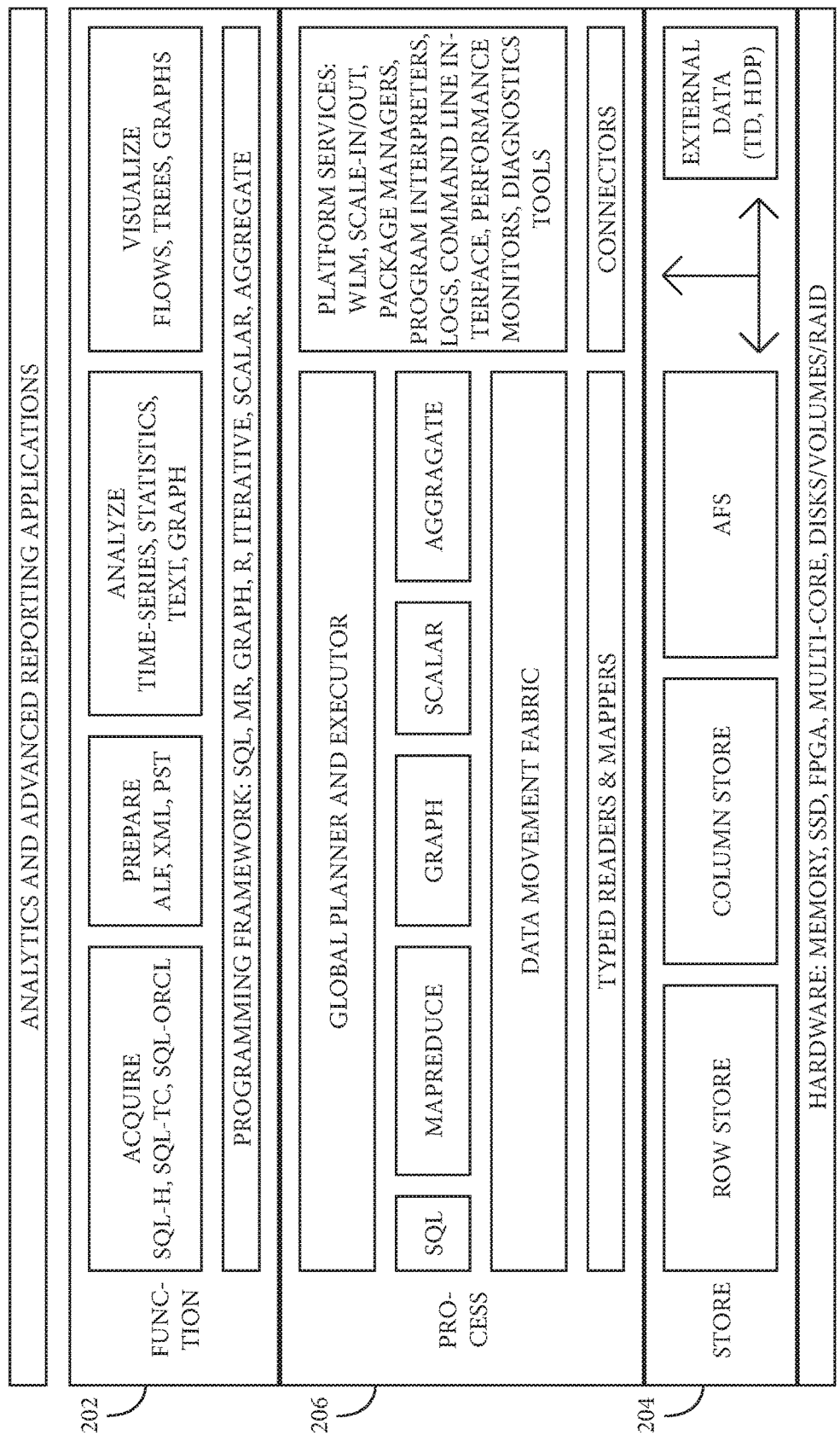
FIG. 2 illustrates various layers of a system for implementing user-defined scalar and aggregate functions in accordance with embodiments disclosed herein.

FIG. 2 shows the various layers 200 that can be used in implementing the system 100. A function layer 202 can provide a library to perform various analytic tasks through simple SQL queries and user interface tools. A store layer 204 can enable data storage in multiple formats. A process layer 206 can allow for query processing. The query processing can be managed by an executor process in the queen node 104. The executor can parse each client query, decompose it to a sequence of subtasks, and drive worker processes in worker nodes 108 running them. The various relations can be hash partitioned across the worker nodes 108 to enable intra-query parallel processing. The executor can optimize an execution plan to minimize data movement. When required, a data movement fabric can move data between worker nodes and across the cluster.

Besides query processing, the systems and method disclosed herein can provide easy-to-use and interactive tools to monitor system statuses, add or remove nodes, load balance queries, split partitions, retry of queries, and restore replication levels.

User-defined table functions can be used to enable rich analytics in SQL. The syntax of such functions can be as follows:

| | | |
|---|---|---|
| 1. | SELECT | ... |
| 2. | FROM | table-function ( |
| 3. | | ON table-or-query |
| 4. | | clause-name(arg, ...) ) ... |

The table function can be treated as a table in a SQL query and therefore appears in the FROM clause. Its input can be tables or sub-queries, appearing as multiple ON clauses. Additional, custom clauses may be utilized to provide arguments that may be needed for the computation, depending on the function implementation. Invocation of the table functions is flexible. The function can be nested or joined with other SQL functions and queries like a SQL table.

The table functions can encapsulate MapReduce and Graph processing models to support different styles of massive parallel processing via easy-to-implement an application program interface (API). The MapReduce table functions can implement a row-based map operator through the RowFunction API or the partition-based reduce operator through the PartitionFunction API. The graph table functions can implement a vertex-based graph operator through the GraphFunction API.

User-defined scalar and aggregate functions can be intuitive programming constructs that can enable custom and non-typical operations in SQL. Both scalar and aggregate functions can input and output tabular data. A user-defined scalar function can be a SQL function with custom logic called once per row. Each time it is called, it can take a value or set of values from the row input data and returns one value. A user-defined aggregate function can be a SQL function with custom logic called once per partition or group. Each time it is called, it takes all input rows and generates a single result. The user-defined aggregate and scalar functions can be widely used in SQL queries.

The user-defined scalar and aggregate functions disclosed herein are unique in at least the following ways: 1) they can be implemented in a distributed environment and can be executed in parallel to support large volume of data; 2) the scalar and aggregate functions can allows loose input schema definition such that input types can be determined dynamically through a mechanism called contract negotiation; 3) the scalar and aggregate functions can be seamlessly integrated with existing MapReduce and Graph table functions.

One benefit of user-defined scalar and aggregate functions disclosed herein is the flexible SQL interfaces provided. Unlike table functions which have to be invoked in the FROM clause, user-defined scalar and aggregate functions as disclosed herein can be placed in the select list of the SELECT clause, HAVING clause, WHERE clause, ORDER BY clause, and GROUP BY clause. For both scalar and aggregate functions, two styles of input arguments can be provided: positional and keyword arguments, thus allowing users to choose the style they feel convenient to pass arguments.

Below are SQL positional and keyword syntax that can be used to invoke scalar and aggregate functions by position and keyword. The function may take a column name, set of column names, or an arbitrary expression formed from column values as inputs. The optional ALL or DISTINCT qualifiers apply only to aggregate function calls and not to scalar functions. When the DISTINCT qualifier is specified, only rows with distinct values would be passed to the function. The ALL qualifier can be the default choice for aggregate functions. When it is used or no qualifier is present, all rows in the expression can be passed to the function.

```
1.   -- SQL Positional Syntax for Scalar Function.
2.   SELECT ... scalar-function (
3.       [ expression ] [, ...] [, arg1] [, arg2] [, ...])
4.
5.   -- SQL Keyword Syntax for Scalar Function.
6.   SELECT ... scalar-function (
7.       ON ( [ expression ] [, ...] )
8.       [ clause-name ( literal [, ...] ) ]
9.       [ ... ] )
10.
11.  -- SQL Positional Syntax for Aggregate Function.
12.  SELECT ... aggregate-function (
13.      [ ALL | DISTINCT ] [ expression ] [, ...]
14.      [, arg1] [, arg2] [, ...]))
15.
16.  -- SQL Keyword Syntax for Aggregate Function.
17.  SELECT ... aggregate-function (
18.      [ ALL | DISTINCT ]
19.      ON ( [ expression ] [, ...] )
20.      [ clause-name ( literal [, ...] ) ]
21.      [ ... ] )
```

In positional invocation arguments can be labeled by their order. For example, argument 1 can be passed at position 1, argument 2 at position 2, and so on. The arguments can be typed and can be provided to the function at the execution time. In keyword invocation arguments can be literals and can be evaluated at prepare time.

The flexibility of user-defined scalar and aggregate functions can also be shown in multi-compute and nested functions. Users can invoke multiple functions in a single statement. Users may also nest a scalar function in another scalar function or a scalar function in an aggregate function.

User-defined scalar and aggregate functions can appear anywhere their corresponding native scalar and aggregate expressions can appear. API's can be provided for programming in Java and C. For example, to create a Java scalar function, a developer can write a class implementing the ScalarFunction interface. The class can implement a constructor handling contract negotiation and the computeValue method with the scalar computation logic.

Below is an example showing how to compose a Concatenate function using the Java Scalar function interface. In the constructor it can be specified that the function can require at least one input column (line 6-8). The output column name can be set as concat and the output column type can be set as character varying (line 10-20). Since the input type is not defined, the function can accept inputs with arbitrary data types. The computeValue method can concatenate all the not null values (line 24-27) and set the concatenated string as the function output value (line 28 and 29) for each input row.

```
1.   public class Concatenate implements ScalarFunction {
2.       private SqlType outputSqlType_;
3.       private ValueHolder outputValue_;
4.
5.   public Concatenate(ScalarRuntimeContract contract) {
6.       if (contract.getInputInfo( ).getColumnCount( )<=1)
7.           throw new IllegalUsageException(
8.               "Requires at least one input column ");
9.
10.      outputSqlType_ = SqlType.getType(
11.          "character varying");
12.      ArrayList<ColumnDefinition> outputColumns =
13.          new ArrayList<ColumnDefinition>( );
```

-continued

```
14.      outputColumns.add(
15.          new ColumnDefinition("concat", outputSqlType_));
16.      contract.setOutputInfo(
17.          new OutputInfo(outputColumns));
18.      outputValue_ = new ValueHolder(outputSqlType_);
19.
20.      contract.complete( );
21.  } // constructor
22.
23.  public ValueHolder computeValue(RowView arg0) {
24.      String ret = "";
25.      for (int i=0; i<arg0.getColumnCount( ); i++) {
26.          if (!arg0.isNullAt(i)) ret += arg0.getStringAt(i);
27.      }
28.      outputValue_.setString(ret);
29.      return outputValue_;
30.  }
31.  }
```

Two examples to compose aggregate functions include NonDecomposableAggregatorFunction and DecomposableAggregatorFunction. An aggregate function can be decomposable if it can be divided into smaller operations, at least some of which can be run independently. An aggregate function is nondecomposable if it cannot be executed by breaking it into pieces that can be run in parallel for the same group or partition of data. These two interfaces can enable different level of parallelism and may impact how the function is executed. From the user aspect, there may not be a difference in SQL invocations. From the function development aspect, a decomposable aggregate function can be implemented using either the DecomposableAggregatorFunction interface or the NonDecomposableAggregatorFunction interface where the decomposable implementation may perform better. A nondecomposable aggregate function can only be implemented using the NonDecomposableAggregatorFunction interface.

Below is an example of how to compose a count function using the decomposable aggregate function interface. The constructor can define both the partial and final output schema as one column in type bigint (lines 14-29). reset can set the counter to 0 when the aggregator is called (lines 12 and 29). aggregateRow can count the number of rows when the aggregator is running independently at each worker node (line 33). aggregatePartialRow can sum the results of aggregateRow (lines 34-36). getPartialRow (lines 38-41) and getFinalValue (lines 43-46) can return the partial and final count, respectively. This sample function can be converted to a non-decomposable aggregate by omitting the partial fields and methods.

```
1.   public class Count implements
2.            DecomposableAggregatorFunction {
3.
4.       private RowHolder partialCountRow_;
5.       private ValueHolder finalCountValue_;
6.       private long count_;
7.       private SqlType outputSqlType_;
8.       private ArrayList<SqlType> partialSchema_ = null;
9.
10.      public Count(DecomposableAggregatorRuntimeContract
11.              contract) {
12.          reset( );
13.
14.          outputSqlType_ = SqlType.bigint( );
15.          finalCountValue_ = new ValueHolder(outputSqlTyp_);
16.          ArrayList<ColumnDefinition> outputColumns =
17.              new ArrayList<ColumnDefinition>( );
18.          outputColumns.add(
```

```
19.            new ColumnDefinition("count", outputSqlType_));
20.        contract.setOutputInfo(
21.            new OutputInfo(outputColumns));
22.
23.        partialSchema_ = new ArrayList<SqlType>( );
24.        partialSchema_.add(outputSqlType_);
25.        contract.setPartialResultSchema(
26.            ImmutableList.elementsOf(partialSchema_));
27.        partialCountRow_ = new RowHolder(partialSchema_);
28.
29.        contract.complete( );
30.    } // constructor
31.
32.    public void reset( ) { count_ = 0; }
33.    public void aggregateRow(RowView row) { count_++; }
34.    public void aggregatePartialRow(RowView partialRow) {
35.        count_ += partialRow.getLongAt(0);
36.    }
37.
38.    public ValueHolder getFinalValue( ) {
39.        finalCountValue_.setLong(count_);
40.        return finalCountValue_.clone( );
41.    }
42.
43.    public RowView getPartialRow( ) {
44.        partialCountRow_.setLongAt(0, count_);
45.        return partialCountRow_.clone( );
46.    }
47. }
```

Both DecomposableAggregatorFunction and Non-DecomposableAggregatorFunction interfaces can inherit from the same parent interface and can contain three methods: aggregateRow which can update the aggregator state for each input row; getFinalValue which can return the final form of the aggregated value at the end of a partition of data, and reset which can reset the aggregator to its initial state for a new partition of data. To create an aggregator function, the developer can write an aggregator class implementing the methods described herein and a constructor which can handle contract negotiation.

The DecomposableAggregatorFunction interface can support a higher level of parallelism as compared to the non-decomposable case. Two additional methods, aggregatePartialRow and getPartialRow, can be implemented with the DecomposableAggregatorFunction. AggregatePartialRow which can update the aggregator partial state for each row input and getPartialRow which can return the partial form of the aggregated value. A partial schema can also be used to set in the constructor, which can be used as the output schema of the partial aggregate and the input schema of the final aggregate operations.

SDK's can be provided to develop user-defined scalar and aggregate functions. For example, an Aster Developer Environment (ADE) can be extended to support scalar and aggregate functions. Design templates and a test environment can be provided for Java scalar and aggregate functions. A SDK in C can also be provided to help write, build, and test scalar and aggregate functions in C. Once the functions are completed, they can be packaged into a JAR or ZIP file and deployed to the cluster using a command such as INSTALL command.

Unlike the MapReduce or Graph table functions, the scalar and aggregate functions can allow multi-compute SQL queries, allow in-place updates and loading of tuples from the output of scalar and aggregate functions, and allow scalar and aggregator functions within WHERE and HAVING clauses along with the SELECT clause. The scalar and aggregator functions can be nested, thus increasing the expressiveness and capabilities of SQL queries. Unless otherwise specified, the functions used herein are cluster-wide user-defined scalar and aggregator functions.

Below is an example database schema for an example retail sales application used as the basis for the examples provided herein.

1. Sales (productId, storeId, quantity, price, discount, grossProfit)
2. Products (productId, storeId, retailPrice, unitCost, rating)
3. Promotion (productId, storeId, discount)
4. Inventory (storeId, productId, quantity)
5. Store (storeId, storeName, state, country)

The executor for scalar and aggregate functions can allow, within a single SQL query, multiple functions over the attributes of the base relations. This multi-compute mechanism can enable multiple functions to be processed over a relation without incurring additional scan overhead for the relation and data transfer (i.e., data shuffling) across the worker nodes 108. In some scenarios, the scan and data transfer overhead can be amortized over N functions, resulting in an almost N-fold performance gain (assuming that CPU costs for a function are negligible compared to the network transfer cost). The following query can compute seven aggregate functions over the relation Sales. Such a query can be a common in an Online Analytic Processing (OLAP), a Decision Support (DS), or a Data Warehouse (DW) system.

```
1. SELECT    productId, AVG(quantity),
2.           MIN(quantity), MAX(quantity),
3.           MIN(price), MAX(price),
4.           AVG(discount), SUM(grossProfit)
5. FROM      Sales
6. GROUP BY ProductId
```

The next example query can process scalar functions (ADJUST_PRICE and FINAL_TAX) over the join between two relations (Products and Store). The function ADJUST_PRICE can take as input four, or more, attributes (e.g., unitCost, rating, state, and country) and one clause (e.g., V) giving the percentage value for the change (e.g., 10%). The function can return a new value for the retailPrice using the proper business logic or rules inherent within the function. The FINAL_TAX function can calculate the tax for a product using three, or more, input attribute values (e.g., retailPrice, state, and country) and a clause value (e.g., RATE).

```
1. SELECT    productId,
2.           ADJUST_PRICE( ON(unitCost, rating,
3.           state, country) V(0.1)),
4.           FINAL_TAX(ON(retailPrice, state,
5.           country) RATE(0.2))
6. FROM      Products, Store
7  WHERE     Products.storeId = Store.storeId
```

The scalar and aggregator functions can be used within the expressions in WHERE and HAVING clauses in the query. The query below shows an example of the usage of a scalar function in the WHERE clause and an aggregator in the HAVING clause. The query can return, for all the stores, the total profit from products with a tax greater than 100, and can show the stores with an average discount value of 10. Note that the first input column in the FINAL_TAX comes from Sales relation. The Scalar and Aggregator functions can be polymorphic and can work irrespective of their types as long as the input columns are semantically consistent (e.g., the first input column should be any taxable price value and can have any numeric type—INT, FLOAT, DOUBLE, etc.).

```
1.  SELECT    storeId, SUM(grossProfit)
2.  FROM      Sales, Store
3.  WHERE     Products.storeId = Store.storeId and
4.            FINAL_TAX(ON(price, state, country)
5.            RATE(0.2)) > 100.00
6.  GROUP BY  storeId
7.  HAVING    AVG(discount)>10
```

The next example query invokes four, or more, functions in a nested fashion. The query can give the top k (10) stores based on their total tax values, normalized to a common currency type, US Dollar (USD). The scalar function CONVERT can transform the price to a common currency (USD); the aggregator function SUM can find the total for each group (i.e., storeId); the scalar function FINAL_TAX can compute the tax value on the total price value; and the TOP_KTH aggregate function can return the Kth (=10) value based on the final tax values for the stores after removing the duplicates with the keyword DISTINCT.

```
1.  SELECT    TOP_KTH( DISTINCT ON(FINAL_TAX( ON(
2.            SUM( CONVERT(price, country)) state,
3.            country ) K(10) )
4.  FROM      Products, Store
5.  WHERE     Products.storeId = Store.storeId
6.  GROUP BY  storeId
```

Contrary to the MapReduce table functions, that logically stand for tables, the user-defined scalar and aggregate functions disclosed herein can represent a finer granularity at attribute levels; so, the latter ones can be used to initialize or update attribute values, and compose rows directly from the function output, simplifying the query. With MapReduce table functions, the output can be written in a temporary table and then the temporary table can be merged with the target table. The following query updates the retailPrice in-place using the same ADJUST_PRICE scalar function used earlier. Note that the function can take the input attributes values from the output rows of a join operator (e.g., between Store and Products).

```
1.  UPDATE    Products
2.  SET       retailPrice=ADJUST_PRICE( ON(unitCost,
3.            rating, state, country), V(0.2) )
4.  FROM      Store
5.  WHERE     Products.storeId = Store.storeId
```

The example query can compute the discount values for the products in the table Products, and can load the newly computed tuples to the Promotion table. The scalar function DISCOUNT can produce a discount value taking the retailPrice, unitCost, and rating as input attributes. If the Promotion table already has a tuple with a key (e.g., storeId and productId), the first part of the WHEN clause can update the discount value for the tuple. Otherwise, the second part (not matched) of the clause can insert the modified tuple.

```
1.  MERGE   Promotion  Pm
2.  USING   Products   Pd
3.  ON      Pm.productId=Pd.productId and
4.          Pm.storeId=Pd.storeId
5.  WHEN matched THEN
6.      UPDATE SET Pm.discount=DISCOUNT(
7.          ON(retailPrice, unitCost, rating))
8.  WHEN not matched THEN
9.      INSERT(Pm.productId, Pm.storeId,Pm.discount)
10.     VALUES(Pd.productId,Pm.storeId,
11.         DISCOUNT( ON(retailPrice,unitCost,rating)) )
```

Query planning of user-defined scalar functions and user-defined aggregate functions can be managed by an executor process in the queen node 104. The executor can parse all client queries to abstract syntax trees. Each scalar function or aggregate function can be converted to a tree node as an atomic operator. Scalar functions and aggregate functions can be dynamically polymorphic. This means that the input and output schemas can be determined by the output schemas of child operators in runtime.

To minimize data movement, the executor can pass the query parse tree to an optimizer sub-routine to generate and optimize logical execution plans. The optimizer can be a rule-based progressive optimization engine that can be written in Ocaml, for example. Each node of the parse tree can be an atomic operator such as a SQL operation, data transfer, user-defined table function, scalar function, or aggregate function. The optimizer can apply heuristic rules such as column projection and limit pushdown to perform top-down and bottom up node transformations. When all the rules are complete, a final logical plan can be produced. Scalar or aggregate functions can have unique opportunities in optimization. Some functions can be combined into one operator and execute in one local data path. Some embedded functions can be computed through an additional join operation.

After the optimizer produces the final logical plans, the executor can concretize the plans to physical plans that can be executed directly in worker node processes. To support user-defined scalar and aggregate functions, a new scalar concretization routine can be generated and can extend the current aggregate routine to support aggregate from SQL directly. Additional setup and cleanup operations can be added to the physical plans. After concretization, the scalar and aggregator functions can be executed in worker nodes 108.

User-defined scalar and aggregate functions can extend the dynamic polymorphic features table functions. This feature can allow the input and output schemas of scalar and aggregate functions to be determined during runtime, thus providing more flexible invocation of user-defined functions. A metaphor called contract negotiation can be used to implement the dynamic polymorphic features during query planning. User-defined scalar or aggregate functions can have a mandatory construct called runtime contract that can specify the input types the function can support and the corresponding output type for each input choice. During planning, the user query can be transformed to a parse tree. A scalar or aggregate function can be represented by a tree node and its input schema can be the output schemas of its child nodes. When the planner has identified the input schemas, the planner can call the function to obtain the output schema based on the contract. Schemas can be taken care of by the system 100 automatically.

Two approaches to implementing a query optimizer the system 100 can include a rule-based optimization and a cost-based optimization. The rule-based optimization can apply a set of optimization rules to determine an efficient execution plan. The cost-based optimization can collect statistics about the tables, indexes, and data distribution, compute execution costs of alternative plans, and selects the cheapest plan.

A global optimizer can be a rule-based progressive optimizer. During query pre-processing, the optimizer can normalize the query syntax tree to an executable logical plan and optimize it based on a set of heuristic rules. To support user scalar and aggregate functions in different SQL constructs with high performance, a rich set of rules can be applied during normalization and optimization as described below:

a) Separate built-in's: When the query contains a mix of built-in and user-defined functions, they can be separated to ensure that the built-in and user-defined functions are executed in the appropriate engine. For user scalar functions, the built-in functions can be either pulled above or pushed below the scalar operator (e.g., the operator that represents the scalar execution engine). For user aggregate functions, the built-in and user functions can be placed into separate query plan fragments and then they can be joined back together.

b) Unnest: Nested user functions can be unnested and written into consecutive executable plans.

c) Consolidate: User-defined functions can be merged to one plan when they implement the same scalar or aggregate interface and share the same data input. This can enable a multi-compute feature as described herein.

d) Normalize: User functions that appear in SQL clauses other than the select clause can be rewritten to be in the select clause to normalize the plan for subsequent rules.

e) Distinct support: When a user aggregate contains the DISTINCT keyword, the optimizer can add a GROUP BY clause to ensure that the input rows are distinct.

f) Multiple Distinct support: When there are multiple user aggregate functions that contain differing distinct columns, the optimizer can separate each distinct column into separate query plan fragments, add a GROUP BY clause to each fragment, and then join the fragments back together.

g) Decomposable Aggregates: User aggregates that can support the decomposable interface can be rewritten into two separate aggregates: partial and final. This can minimize data movement and improve parallelism by performing eager aggregation.

h) Minimize transfer: Existing rules can be used to push down and pull up operators to minimize data movement between worker nodes 108. For example, aggregate functions can be pushed down to be executed first when possible to reduce data movements.

i) Parallel execution: Parallel execution of user-defined function can be enabled for both scalar and aggregate functions.

Execution of user-defined scalar and aggregate functions can be controlled by a routine called bridge in every worker node 108. Bridge can be a set returning function (SRF) that can be implemented in a local database. The database can act as a relational engine for standard relational operations and the bridge can control specialized engines for user-defined computation.

Bridge can execute user-defined scalar and aggregate engines in a separated process from the local database instance. This implementation can provide a sandbox to effectively execute and control user-written functions. With low development costs, operating system mechanisms can be utilized to provide resource allocation, task control, and security.

In addition to controlling their life cycles, bridge can also manage scalar and aggregate engines' data input and output. Bridge can fetch input data described in the physical execution plan from the local database and provide it to the engine and function through partition and row iterators. When the scalar or aggregate functions are completed, bridge can flush the output back to the database. Besides managing local data, bridge can also act as data fabric end points and transfer data between worker nodes 108. When external data is required to execute a scalar or aggregate function, the bridge at the data source worker node can connect with the bridge at the data destination worker and move data from source to destination. All data movements between nodes can be completed in separated physical plans before bridges invoke scalar or aggregate engines to execute user functions.

Scalar and aggregate execution engines can directly control invocations of user-defined functions and manage their data I/O. To support both query planning and execution, a planning mode and one or more execution modes in each engine can be provided. In planning mode, the engine can interact with the planner and can determine the output schema according to the input schema and the function runtime contract. In execution modes, the engine can execute user functions. Each execution mode can represent one procedure of scalar or aggregate functions. Based on the execution mode specified in the query physical plan, the engine can execute user-defined functions corresponding to that procedure and can manage the data input and output. For example, a new mode can be added to support collaborative planning to optimize query planning.

A scalar engine instance can provide source data to scalar functions through a row iterator at runtime. It can cache the function return value for each row, call bridge services to flush the outputs to the local storage when the buffer is full, or the computation is completed.

Below is an example aggregate engine control flows for RowToFinal, RowToPartial, and PartialToFinal procedures.

```
1.   // Nondecomposable Aggregate
2.   case RowToFinal:
3.       aggFn.reset( );
4.       while (inputIterator.advanceToNextRow( )) {
5.           aggFn.aggregateRow(inputIterator);
6.       }
7.       ret = aggFn.getFinalValue( );
8.       break;
9.   // Decomposable Aggregate
10.  case RowToPartial:
11.      aggFn.reset( );
12.      while (inputIterator.advanceToNextRow( )) {
13.          aggFn.aggregateRow(inputIterator);
14.      }
15.      ret = aggFn.getPartialValue( );
16.      break;
17.  // Decomposable Aggregate
18.  case PartialToFinal:
19.      aggFn.reset( );
20.      while (inputIterator.advanceToNextRow( )) {
21.          aggFn.aggregatePartialRow(inputIterator);
22.      }
23.      ret = aggFn.getFinalValue( );
24.      break;
```

The aggregate engine can operate similar to the scalar engine and its execution choices can be richer. An aggregate engine instance can manage local data through data caches, partition iterators, and other bridge services. To fully utilize a distributed environment, aggregate functions can be separated into decomposable and non-decomposable aggregate functions, providing different execution modes and parallelism for each. Decomposable aggregate functions can be decomposable tasks which can be separately partial and final aggregation, thus enabling parallel computation for each source data partition. For example, sum is a decomposable aggregate that can compute the partial sums at each worker node 108 in parallel and then aggregate the final result. Nondecomposable aggregate functions can be tasks whose source data cannot be separated, such as finding the median. The decomposable procedures RowToPartial and PartialToFinal and the non-decomposable one RowToFinal can be called and can implement three corresponding execution modes in the engine. Each procedure can be executed independently in a separated physical plan. Their source data can be moved to the destination worker node 108 in a different plan in advance as described herein. When a procedure is invoked, the engine can execute the user aggregate functions accordingly.

A difference between the execution of user-defined scalar and aggregate functions and previous user-defined table function can be the number of functions being executed in each execution plan and local input path. For user-defined MapReduce or Graph table functions, a single function can be executed. Different functions can be in separated execution plans and do not share input iterator even if their source data are the same. To improve the usage of local input, multi-compute in both scalar and aggregate engines can be supported. This means the engines can allow computing multiple functions in an iteration of source data, which may effectively reduce local I/O costs and improve performance.

Below is an example tables functions that can compute adjust price and tax.

```
1.  SELECT      productId, adjustPrice, tax
2.  FROM        FINAL_TAX_TABLE_FN (
3.              on (
4.                  ADJUST_PRICE_TABLE_FN (
5.                  on (
6.                      SELECT    productId, retailPrice,
7.                                unitCost, rating,
8.                                state, country
9.                      FROM      Products, Store
10.                     WHERE     Products.storeid =
11.                               Store.storedId
12.                 )
13.                 PERCENTAGEVALUE(0.1)
14.                 RESULT('adjustPrice')
15.             )
16.             RATE(0.2)
17.             RESULT('tax')
18.         );
```

The query above illustrates the power of multicompute. It can be modified from the scalar function examples disclosed here while outputting the same result. The query can process table function (e.g., ADJUST_PRICE_TABLE_FN) over the join between two relations (Products and Store). It can then process another table function (e.g., FINAL_TAX_TABLE_FN) over the previous output. Its table functions ADJUST_PRICE_TABLE_FN and FINAL_TAX_TABLE_FN can be executed in two separated plans and the output of ADJUST_PRICE_TABLE_FN can be the input of FINAL_TAX_TABLE_FN. In contrast, scalar functions ADJUST_PRICE and FINAL_TAX disclosed above are executed in the same plan and share input iterators. As a result, the local I/O cost for the scalar computations can be ½ of the table computations. The benefit of multi-compute can be more significant when there are more user functions in the query. For instance, the aggregate example above can have seven user functions and its local I/O cost is ⅐ of the equivalent table functions.

Execution of scalar functions can be fully parallel. Scalar functions are row functions and have no input dependency between source data in different worker nodes 108. This freedom can allow the scalar engine instances at each worker node 108 to execute them independently.

User-defined aggregate functions can be executed in parallel when possible. When the aggregate functions implement the decomposable interface, their physical execution plans can consist of row-to-partial and partial-to-final aggregate plan fragments. In the first plan fragment aggregate engines at each worker node 108 of the cluster can execute the function instances in parallel to compute the partial results. The second plan fragment can be executed in parallel if there are grouping columns, otherwise it can be done serially. The partial results from the first plan fragment can be aggregated to compute the final results. When the functions are non-decomposable, the source data can be repartitioned based on the grouping columns and then executed in parallel.

In an example scenario, a movie producer would like to conduct a marketing survey about audiences' impression on their latest movie XYZ based on geographic location in U.S. To do so, they collect a large number of tweets with comments about the movie and the users' locations. The survey can then be converted to solving an analytic problem containing four tasks: extract relevant data, perform sentiment analysis, perform geographic analysis, and compute simple statistics based on the analysis results. Below is an example solution that completes these analytic tasks in a single SQL query.

```
1.  SELECT state,
2.      AVG(sentiment_score) AS average,
3.      COUNT(sentiment_score) AS count,
4.      STDDEV(sentiment_score) as stddev,
5.      MAX(sentiment_score) AS max,
6.      MIN(sentiment_score) AS min
7.  FROM (
8.      SELECT tweet_id,
9.          PointInPolygonScalarUDF(
10.             on(coordinates_latitude,
11.             coordinates_longitude)
12.             Reference('stateCoordinates.txt')
13.             Boundary('state_coordinates')
14.             Tag('state_full_name')
15.         ) AS state,
16.         ExtractSentimentScalarUDF(
17.             on(tweet_text)
18.             Model('dictionary:dictionary.txt')
19.             Type('integer')
20.             Range(-2, 2)
21.         ) AS sentiment_score,
22.         tweet_text,
23.         coordinates_latitude,
24.         coordinates_longitude
25.     FROM (
26.         SELECT *
27.         FROM JsonTweetParserMapReduceTableUDF(
28.             on tb_raw_tweets
29.             Fields('id:tweet_id',
30.                 'text:tweet_text',
31.                 'latitude:coordinates_latitude',
32.                 'longitude:coordinates_longitude'
33.             ))
34.         ) AS tweets
35.     ) AS sentiment_geo
36.     GROUP BY state
37.     ORDER BY state;
```

As shown in the example above, the first step of the analyses can be to extract data needed for the sentiment and geographic analysis. JsonTweetParserMapReduceTableUDF in lines 26-34 in the query can be a custom SQLMR function that does this task. The function can pull target fields (e.g., id, text, latitude, and longitude) from the JSON tweets and assign them column names (e.g., tweet_id, tweet_text, coordinates_latitude, and coordinate_longitude) in the output table, respectively.

After obtaining the target data, the next two tasks can be to run geographic and sentiment analyses on them. In order to minimize data I/O, the geographic and sentiment scalar function, PointInPolygonScalarUDF and SentimentScalarUDF, can be called in the same query (lines 8-35). PointInPolygonScalarUDF can be a scalar function that can compute the geographic region for given coordinates. It takes two columns, coordinates_latitude and coordinate_longitude, as inputs and outputs the full name of the state where the pair of latitude and longitude belongs. stateCoordinates.csv can be a file that outlines the boundary of each state in the United States and serves as a reference for the geographic analysis. state_coordinates and state_full_name are key names in the reference file. state_coordinates can mark the coordinates of the geographic region in the reference file and state_full_name can indicate the function output name of the region. ExtractSentimentScalarUDF can be a scalar function that can also be use a reference file to compute sentiment score on each tweet. dictionary.csv can be a sentiment dictionary that assign positive and negative scores to common English words. Argument Type and Range can indicate that the output of the sentiment function is and integer and is in the adjusted range of [−2, 2].

Figure 4:
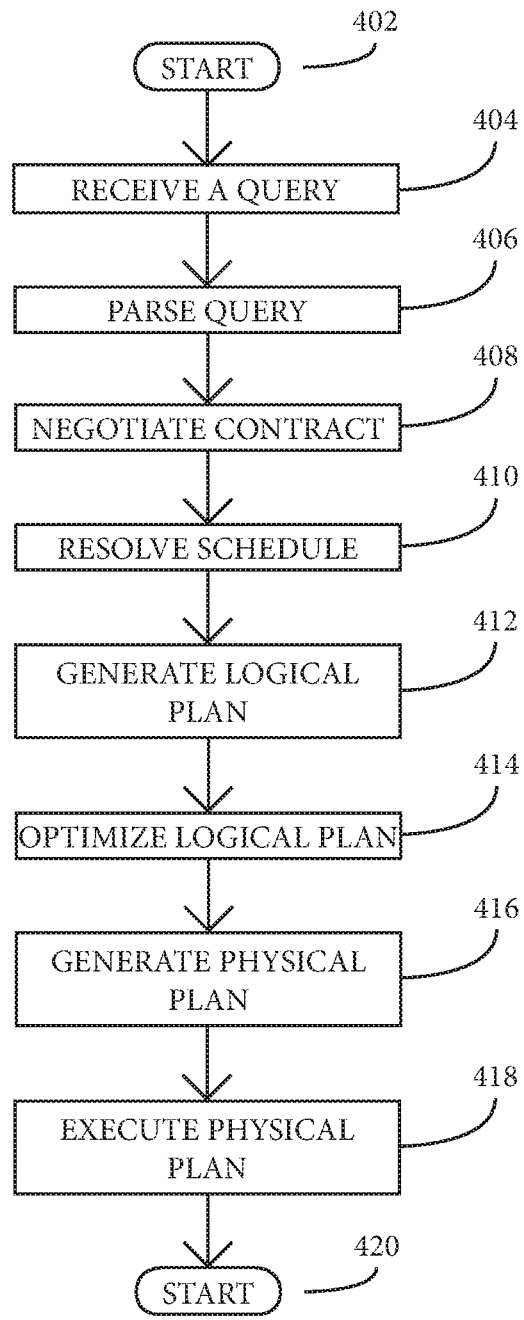
FIG. 4 illustrates an example method for implementing user-defined scalar and aggregate functions in accordance with embodiments disclosed herein.

Finally, built-in aggregate functions can be applied to compute simple statistics such as average, count, standard deviation, and max and min of the geographic and sentiment analysis results. Built-in aggregate functions can be selected instead of writing user-defined aggregate functions because of at least three reasons. First, user-defined aggregate functions can be used to complement aggregate computation when there are no built-in functions to perform the tasks. In other words, when built-in functions are available, users do not need to write custom aggregate functions. Second, built-in functions can be native functions running inside the worker node 108 database and can perform better than out-of-process user-defined aggregate functions. Finally, the new user-defined functions can be seamlessly integrated with existing features such SQLMR table functions, database built-in functions, and any SQL operations. FIG. 4 shows a visual representation of the above analysis and show that the insights gained in big data discovery can be important to help draw conclusions and make decisions.

The query, as executed using Teradata's Aster platform, can be evaluated in a commodity cluster with different sizes of input tweets and its results can be compared with open source solution Hadoop Pig and Hive. The commodity cluster consists of 6 nodes, each of which has 12 2.8 GHz cores and 94 GB RAM. The cluster is configured as 1 queen node and 5 worker nodes for Aster and is reconfigured as 1 namenode and 5 datanodes when running Hadoop. The numbers of input tweets are 1 million, 2 million, 4 million, 8 million, 16 million, 32 million, 65 million, 131 million, 262 million, 524 million and 1 billion. As the average size of a tweet is 2.7 KB, the data volumes we examine are 2.7 GB, 5.4 GB, 10.8 GB, 21.6 GB, 43.2 GB, 86.4 GB, 172.8 GB, 345.6 GB, 691.2 GB, 1.35 TB and 2.7 TB, respectively.

In the Hadoop approach, the same algorithms in Pig UDF were implemented to extract data and perform sentiment and geographic analysis. Hive was used to query the basic statistics about the pig results such as average, count, standard deviation, max and min, and applied ORDER BY clause to sort the results by geographic locations.

Table 1 shows the results of the experiments in seconds. Column A (Aster) is the total execution time for the Aster query. Column P (Pig) presents the time of running Pig to extract data and perform sentiment and geographic analyses. Column H (Hive) records the time hive aggregates and sorts the pig results. Column P+H is the sum of Pig and Hive execution time. The last column PH/A compares the run time between Aster and Pig plus Hive. The data shows that for small workload less than 4 million records, Aster performs more than 5.5 times faster. For median workload between 4 million and 16 million records, Aster is at least 2.9 times as fast as Hadoop. For large workload bigger than 16 million records, Aster has more than 25% performance advantage. In summation, the experiment results reveal that Aster performs better than Pig and Hive for all tested input data sizes.

TABLE 1

Aster vs. Pig and Hive Comparison Data

| Tweet Number | A | P | H | P + H | PH/A |
|---|---|---|---|---|---|
| 1,024,000 | 10 | 105 | 52 | 157 | 15.700 |
| 2,048,000 | 13 | 106 | 55 | 161 | 12.385 |
| 4,096,000 | 25 | 111 | 52 | 163 | 6.520 |
| 8,192,000 | 53 | 127 | 53 | 180 | 3.962 |
| 16,384,000 | 77 | 172 | 55 | 227 | 2.948 |
| 32,768,000 | 164 | 254 | 57 | 311 | 1.896 |
| 65,536,000 | 319 | 429 | 62 | 491 | 1.539 |
| 131,072,000 | 611 | 750 | 73 | 823 | 1.347 |
| 262,144,000 | 1,155 | 1,414 | 126 | 1,540 | 1.333 |
| 524,288,000 | 2,279 | 2,750 | 199 | 2,949 | 1.294 |
| 1,048,576,000 | 4,594 | 5,372 | 373 | 5,745 | 1.251 |

Multi-compute can be a differential feature in the user-defined scalar and aggregate infrastructure. The example query below is similar to the query above except that the scalar query from lines 8-34 has been rewritten to embed queries. The rewritten scalar query was executed using the same data input and on the same hardware as described above.

```
 1.  SELECT tweet_id,
 2.      PointInPolygonScalarUDF(
 3.          on(coordinates_latitude,
 4.              coordinates_longitude)
 5.          Reference('stateCoordinates.txt')
 6.          Boundary('state_coordinates')
 7.          Tag('state_full_name')
 8.      ) AS state,
 9.      sentiment_score,
10.      tweet_text,
11.      coordinates_latitude,
12.      coordinates_longitude
13.  FROM (
14.      SELECT tweet_id,
15.          ExtractSentimentScalarUDF(
16.              on(tweet_text)
17.              Model('dictionary:dictionary.txt')
18.              Type('integer')
19.              Range(−2, 2)
20.          ) AS sentiment_score,
21.          tweet_text,
22.          coordinates_latitude,
23.          coordinates_longitude
24.      FROM (
25.          -- SqlMR json parser
26.          ) AS tweets
27.      ) AS tweets_sentiment
```

Table 2 shows the experiment results in seconds. Column MC (multi-compute) presents the runtime of executing sentiment and geographic analyses in the same query using multicompute. Column S (Sentiment) is the execution time of the sentiment function from lines 14-27 above. Column P (Point-In-Polygon) records the time of finishing the point in polygon function from lines 2-13. Column EQ (Embedded Queries) sums the execution time the sentiment and point in polygon analyses in Column S and P. FIG. 5 shows a comparison of the runtime of multicompute and embedded queries in bar charts. FIG. 5 shows that multicompute results in 40% or more performance improvement for all input sizes.

TABLE 2

Multi-Compute vs. Embedded Queries (seconds)

| Tweet Number | MC | S | P | EQ |
|---|---|---|---|---|
| 1,024,000 | 3 | 3 | 3 | 6 |
| 2,048,000 | 4 | 3 | 4 | 7 |
| 4,096,000 | 6 | 4 | 5 | 9 |
| 8,192,000 | 10 | 7 | 9 | 16 |
| 16,384,000 | 18 | 12 | 16 | 28 |
| 32,768,000 | 34 | 21 | 30 | 51 |
| 65,536,000 | 66 | 39 | 56 | 95 |
| 131,072,000 | 128 | 79 | 111 | 190 |
| 262,144,000 | 254 | 151 | 208 | 359 |
| 524,288,000 | 492 | 302 | 417 | 719 |
| 1,048,576,000 | 997 | 574 | 870 | 1,444 |

The user-defined scalar and aggregate functions disclosed herein are lasting database features. They extend the database capability by allowing customization of data processing. Popular standalone relational database management systems (RDBMS) often offer extensive supports to scalar and aggregate functions.

Figure 3:
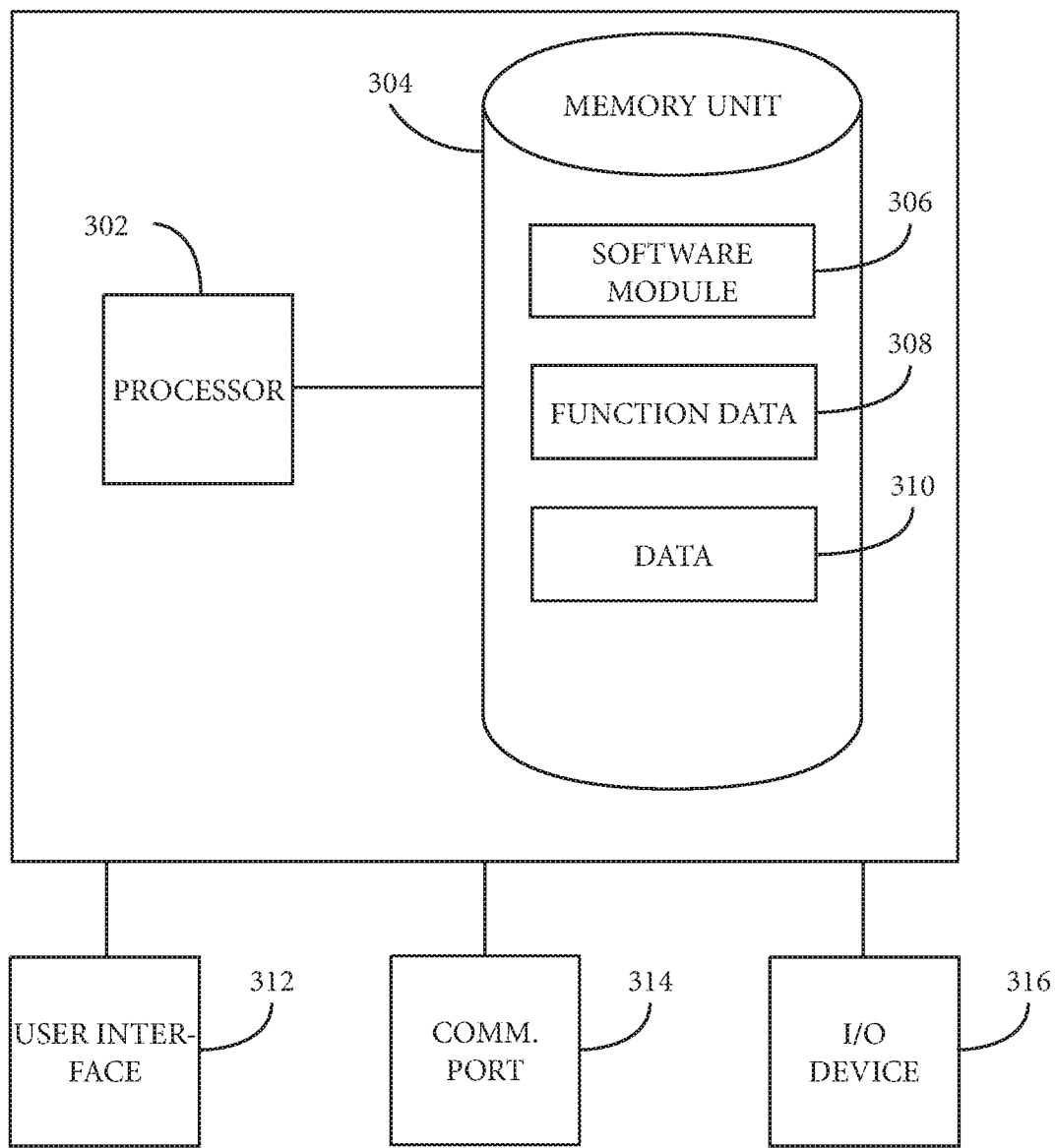
FIG. 3 illustrates an example schematic of a computing device in accordance with embodiments disclosed herein.

FIG. 3 shows an example schematic of a computing device 300 in accordance with embodiments disclosed herein. The computing device 300 can be implemented as the client terminal 102, the queen node 104, the worker nodes 108, and the loader nodes 112. As shown in FIG. 3, the computing device 300 may include a processor 302 and a memory unit 304. The memory unit 304 may include a software module 306, function data 308, and data 310. While executing on the processor 302, the software module 304 may perform processes for implementing user-defined scalar and aggregate functions, including, for example, one or more stages included in a method 400 described below with respect to FIG. 4.

The function data 308 can include built-in functions and user-defined functions as disclosed herein. The function data 308 can include functions created using the client terminal 102, the queen node 104, the worker nodes 108, and the loader nodes 112. The function data 308 can be received from other computing devices.

The data 310 can include the queries 106 and the data 110. described above. In addition, the data 310 can include execution plans, optimization strategies, and heuristic data as disclosed herein. The data 310, or portions of the data 310, can be generated by the computing device 300 (e.g., by the client terminal 102 or worker nodes 108). In addition, the data 310, or portions of the data 310, can be received by the computing device 300. For example, the data 310 may include compiled data, functions, and execution plans that can be received and stored in the memory unit 304.

The computing device 300 can also include a user interface 312. The user interface 312 can include any number of devices that allow a user to interface with the computing device 300. Non-limiting examples of the user interface 312 include a keypad, a microphone, a speaker, a display (touch-screen or otherwise), etc.

The computing device 300 can also include a communications port 314. The communications port 314 can allow the computing device 300 to communicate with switches, nodes, or other computing devices such as those described above with regard to FIG. 1. Non-limiting examples of the communications port 314 include, Ethernet cards (wireless or wired), Bluetooth® transmitters and receivers, near-field communications modules, etc.

The computing device 300 may also include an input/output (I/O) device 316. The I/O device 316 can allow the computing device 300 to receive and output information. Non-limiting examples of the I/O device 316 include, a camera (still or video), a printer, a scanner, etc.

The computing device 300 can be implemented using a personal computer, a network computer, a server, a mainframe, a handheld device, or any other similar computer-based workstation. The computing device 300 can be located in close proximity to the various nodes and switches described herein. The computing device 300 can also be remote from the various nodes and switches described herein. For instance, the computing device 300 can be a desktop computer or a server that includes a software stack running a plurality of applications. The desktop computer or server can be located in close proximity to a node such as queen node 104 and remote from the worker nodes 108. In addition, the computing device 300 may be a personal computer interacting with a plurality of remote servers via a network of switches and routers.

FIG. 4 shows an example method 400 for implementing scalar and aggregate functions as disclosed herein. The method 400 can begin at stage 402 and proceed to stage 404 where the computing device 300 can receive a query. For example, the client terminal 102 can receive a query that can include a plurality of user-defined functions as disclosed herein.

From stage 404 the method 400 can proceed to stage 406 where the query can be parsed. For example, the query can be parsed into a plurality of nodes. Stated another way, each of the user-defined functions in the query can be separated from the query and assigned to a plurality of nodes as disclosed herein. For instance, as disclosed herein, the user-defined functions can be parsed from the query in order to be executed on worker nodes 108.

From stage 406 the method 400 can proceed to stage 408 where a contract can be negotiated. For example, as disclosed herein a user-defined scalar or aggregate functions can have a mandatory construct called runtime contract that can specify the input types the function can support and the corresponding output type for each input choice. Identified the input schemas can be used to call functions to obtain the output schema based on the contract. The various contracts and schemas can be negotiated.

From stage 408 the method 400 can proceed to stage 410 where a schedule can be resolved. The contact negotiation may uncover conflicts. During stage 410 the conflicts in scheduling can be resolved.

From stage 410 the method 400 can proceed to stage 412 where a logical plan can be generated. For example, once the conflicts are resolved, a final logical plan can be produced. The logical plan can include various information about the user-defined functions as disclosed herein.

From stage 412 the method 400 can proceed to stage 414 were the logical plan can be optimized. For example, an optimizer can analyze the logical plan and optimized the logical plan as disclosed herein. For instance, as disclosed herein, the logical plan can be optimized to minimize data transfer between nodes.

From stage 414 the method 400 can proceed to stage 416 were a physical plan can be generated. For example, after the optimizer produces the final logical plans, the executor can concretize the plans to physical plans that can be executed directly in worker node processes. To support user-defined scalar and aggregate functions, a new scalar concretization routine can be generated and can extend the current aggregate routine to support aggregate from SQL directly. Additional setup and cleanup operations can be added to the physical plans. After concretization, the scalar and aggregator functions can be executed in worker nodes 108.

From stage 41 the method 400 can proceed to stage 418 where the physical plan can be executed. For example, as disclosed herein, the physical plan can be implemented in the various worker nodes 108 and the various data can be analyzed based on the query. From stage 410 the method 400 can terminate at stage 412.

Additional Examples

To better illustrate the systems and methods disclosed herein, a non-limiting list of examples is provided here:

Example 1 includes a method. The method can include receiving, at a computing device including a processor, a query including a plurality of user-defined functions and parsing, by the computing device, the query into a plurality of atomic operators. Each of the plurality of user-defined functions can correspond to one of a plurality of atomic operators. The method can further include generating, by the computing device, an execution plan that minimize data transfer between the plurality of nodes and storing, by the computing device, the execution plan to a memory.

In Example 2, the method of Example 1 can optionally include the plurality of user-defined functions including a user-defined scalar function and a user defined aggregate function.

In Example 3, the method of any one of or any combination of Examples 1 and 2 can optionally include each of the plurality of user-defined functions being dynamically polymorphic.

In Example 4, the method of any one of or any combination of Examples 1-3 can optionally include each of the plurality of user-defined functions including a runtime contract that specifies an acceptable input types and a corresponding output types for each of the user-defined function.

In Example 5, the method of any one of or any combination of Examples 1-4 can optionally include generating the execution plan including applying heuristic rules to determine runtimes and the data transfer between a plurality of execution plan fragments.

In Example 6, the method of any one of or any combination of Examples 1-5 can optionally include generating the execution plan including combining two or more of the user-defined functions into one operator that can be executed in one local path of data in a worker node.

In Example 7, the method of any one of or any combination of Examples 1-6 can optionally include executing a component of the execution plan in a corresponding node of the plurality of nodes.

Example 8 can include a system. The system can comprise a processor and a memory. The memory can store instructions that, when execute by the processor, cause the processor to perform operations. The operations can comprise: receiving a query including a plurality of user-defined functions, parsing the query into a plurality of nodes, generating an execution plan that minimizes data transfer between the plurality of nodes, and storing the execution plan to the memory. Each of the plurality of user-defined functions can correspond to one of a plurality of nodes.

In Example 9, the system of Example 8 can optionally include the plurality of user-defined functions including a user-defined scalar function and a user defined aggregate function.

In Example 10, the system of any one of or any combination of Examples 8 and 9 can optionally include each of the plurality of user-defined functions being dynamically polymorphic.

In Example 11, the system of any one of or any combination of Examples 8-10 can optionally include each of the plurality of user-defined functions including a runtime contract that specifies an acceptable input types and a corresponding output types for each of the user-defined function.

In Example 12, the system of any one of or any combination of Examples 8-11 can optionally include generating the execution plan including applying heuristic rules to determine runtimes and the data transfer between a plurality of execution plan fragments.

In Example 13, the system of any one of or any combination of Examples 8-12 can optionally include generating the execution plan including combining two of the user-defined functions into one operator that can be executed in one local path of data in a worker node.

In Example 14, the system of any one of or any combination of Examples 8-13 can optionally include the operations further comprising distributing a component of the execution plan to a corresponding node of the plurality of nodes.

Example 15 can include a computer-readable medium. The computer-readable medium can comprise instructions that, when executed by a processor, cause the processor to perform operations. The operations can comprise: receiving a query including a plurality of user-defined functions, parsing the query into a plurality of nodes, generating an execution plan that minimizes data transfer between the plurality of nodes, and storing the execution plan to the memory. Each of the plurality of user-defined functions can correspond to one of a plurality of nodes.

In Example 16, the computer-readable medium of Example 15 can optionally include the plurality of user-defined functions including a user-defined scalar function and a user defined aggregate function. Each of the user-defined scalar function and the user-defined aggregate function can be dynamically polymorphic.

In Example 17, the computer-readable medium of any one of or any combination of Examples 15 and 16 can optionally include each of the plurality of user-defined functions including a runtime contract that specifies an acceptable input types and a corresponding output types for each of the user-defined function.

In Example 18, the computer-readable medium of any one of or any combination of Examples 15-17 can optionally include wherein generating the execution plan includes applying heuristic rules to determine runtimes and the data transfer between a plurality of execution plan fragments.

In Example 19, the computer-readable medium of any one of or any combination of Examples 15-18 can optionally include generating the execution plan including combining two or more of the user-defined functions into one operator that can be executed in one local path.

In Example 20, the computer-readable medium of any one of or any combination of Examples 15-19 can optionally include the operations further comprising executing a component of the execution plan in a corresponding node of the plurality of nodes.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A method comprising:
receiving, at a computing device including a processor, a query including a plurality of dynamically polymorphic user-defined functions, the plurality of dynamically polymorphic user defined functions including a user-defined scalar function and a user-defined aggregate function and each of the plurality of dynamically polymorphic user-defined functions includes a runtime contract that specifies acceptable input types and corresponding output types for each of the user-defined functions;
parsing, by the computing device, the query into a plurality of nodes, each of the plurality of user-defined functions corresponding to one of a plurality of nodes;
determining, by the computing device, input and output schemas for said plurality of dynamically polymorphic user-defined functions in accordance with said runtime contracts;
generating, by the computing device, an execution plan that minimizes data transfer between the plurality of nodes; and
storing, by the computing device, the execution plan to a memory.

2. The method of claim 1, wherein generating the execution plan includes applying heuristic rules to determine runtimes and the data transfer between a plurality of execution plan fragments.

3. The method of claim 1, wherein generating the execution plan includes combining two of the dynamically polymorphic user-defined functions into one operator that can be executed in one local path of data in a worker node.

4. The method of claim 1, further comprising executing a component of the execution plan in a corresponding node of the plurality of nodes.

5. A system comprising:
a processor; and
a memory that stores instructions that, when execute by the processor, cause the processor to perform operations comprising:
receiving a query including a plurality of dynamically polymorphic user-defined functions, the plurality of dynamically polymorphic user defined functions including a user-defined scalar function and a user-defined aggregate function and each of the plurality of dynamically polymorphic user-defined functions includes a runtime contract that specifies acceptable input types and corresponding output types for each of the user-defined functions,
parsing the query into a plurality of nodes, each of the plurality of user-defined functions corresponding to one of a plurality of nodes,
determining input and output schemas for said plurality of dynamically polymorphic user-defined functions in accordance with said runtime contracts;
generating an execution plan that minimizes data transfer between the plurality of nodes, and
storing the execution plan to the memory.

6. The system of claim 5, wherein generating the execution plan includes applying heuristic rules to determine runtimes and the data transfer between a plurality of execution plan fragments.

7. The system of claim 5, wherein generating the execution plan includes combining two of the dynamically polymorphic user-defined functions into one operator that can be executed in one local path of data in a worker node.

8. The system of claim 5, wherein the operations further comprise executing a component of the execution plan in a corresponding node of the plurality of nodes.

9. A non-transitory computer-readable medium comprising instructions that, when executed by a processor, cause the processor to perform operations comprising:
receiving a query including a plurality of dynamically polymorphic user-defined functions, the plurality of dynamically polymorphic user defined functions including a user-defined scalar function and a user-defined aggregate function and each of the plurality of dynamically polymorphic user-defined functions includes a runtime contract that specifies acceptable input types and corresponding output types for each of the user-defined functions,
parsing the query into a plurality of nodes, each of the plurality of user-defined functions corresponding to one of a plurality of nodes,
determining input and output schemas for said plurality of dynamically polymorphic user-defined functions in accordance with said runtime contracts;
generating an execution plan that minimizes data transfer between the plurality of nodes, and
storing the execution plan to the memory.

10. The non-transitory computer-readable medium of claim 9, wherein generating the execution plan includes applying heuristic rules to determine runtimes and the data transfer between a plurality of execution plan fragments.

11. The non-transitory computer-readable medium of claim 9, wherein generating the execution plan includes combining two of the dynamically polymorphic user-defined functions into one operator that can be executed in one local path in a worker node.

12. The non-transitory computer-readable medium of claim 9, wherein the operations further comprise executing a component of the execution plan in a corresponding node of the plurality of nodes.

* * * * *